United States Patent Office 3,448,058
Patented June 3, 1969

3,448,058
DEHYDROGENATION CATALYST
Melvin R. Arnold, Louisville, Ky., assignor to Chemetron Corporation, Chicago, Ill., a corporation of Delaware
No Drawing. Filed Nov. 12, 1965, Ser. No. 507,553
Int. Cl. B01j *11/82*
U.S. Cl. 252—443                                6 Claims This invention relates to dehydrogenation catalysts and an improved method for their production. More particularly, it relates to the production of catalysts suitable for the dehydrogenation of alkyl aromatic hydrocarbons to alkenyl aromatic hydrocarbons and to the catalysts so produced.

It is well known that styrene is produced commercially by the catalytic dehydrogenation of ethylbenzene. The process is usually carried out by passing ethylbenzene and a relatively large proportion of steam, for example, 2–30 moles of steam per mole of hydrocarbon, over a bed of a suitable catalyst at elevated temperatures. The catalysts used in the process usually contain as a primary active constituent certain metals of Groups IV to VIII of the Periodic Table either in their free form or, preferably, in the form of various of their compounds such as the oxides, sulfides, phosphates, etc. Generally, mixtures of two, three or more of such compounds are employed. Some of these catalysts, however, are characterized by certain disadvantages such as low conversion and/or selectivity of reaction, poor physical strength, short catalyst life, and necessity for frequent regeneration. Typical catalysts which have been found to have a minimum of these disadvantages are alkalized iron oxide catalysts wherein an alkali metal or alkaline earth metal compound is employed as a promoter, said promoter being usually a compound of potassium. These catalysts are autoregenerative under conditions at which the dehydrogenation reaction is effected, that is, they are capable of being continually regenerated under the conditions of the reaction. This feature obviates the necessity for interrupting the process and regenerating the catalyst, a procedure which includes burning the carbon deposits off the surface of the catalyst particles, as is required with other dehydrogenation catalysts.

In the copending application of Emerson H. Lee, Ser. No. 507,514, filed of even date herewith now U.S. Patent 3,387,053 issued on June 4, 1968, there are described and claimed a group of dehydrogenation catalysts which comprise iron oxide as the active catalytic agent, about 1% to about 8% by weight of zinc oxide and/or copper oxide intimately dispersed in the matrix of iron oxide, and an alkali promoter such as potassium carbonate. In these catalysts the ingredients are intimately dispersed so that the magnetic susceptibility of the catalyst composition prior to use is in the range from about $30 \times 10^{-6}$ to about $300 \times 10^{-6}$ centimeter-gram-second units (c.g.s.u.) and the surface area of the catalyst composition prior to use is in the range from about 1 to about 5 square meters per gram. These catalysts are produced by coprecipitation of iron oxide and zinc oxide and/or copper oxide from a solution containing ferrous, zinc and/or copper ions by the addition of alkali. The mixed precipitate of iron, zinc and/or copper oxides is air blown at elevated temperature at a pH in the range from 6.8 to 7.2, washed free of soluble materials, filtered and dried. The mixture of iron, zinc and/or copper oxides so produced is mulled with an alkali promoter and a binding agent such as portland cement, and formed into catalyst shapes.

In accordance with my invention, intimately dispersed compositions of iron oxide and zinc oxide and/or copper oxide are produced by wet mulling the metal oxides with aqueous ammonia. In this manner a dispersion of the metal oxides is produced which has a high magnetic susceptibility in the range of about $30 \times 10^{-6}$ to about $300 \times 10^{-6}$ c.g.s.u. This procedure is simpler and less expensive than the coprecipitation procedure described above and produces metal oxide catalyst compositions of high activity in dehydrogenation reactions.

It is an object of this invention to provide an improved method of producing dehydrogenation catalyst compositions. It is a further object to provide dehydrogenation catalysts produced by the improved method. Another object is to provide a method for producing intimately dispersed metal oxide catalyst compositions by a wet mulling technique. A further object is to provide improved catalysts for the dehydrogenation of alkyl aromatic hydrocarbons to alkenyl aromatic hydrocarbons and an improved method for their production. These and other objects are apparent from and are achieved in accordance with the following disclosure.

As described in the copending application of Emerson H. Lee referred to above, an improved dehydrogenation catalyst comprises iron oxide as the active catalytic agent, from about 1% to about 8% by weight of a matrix promoter, i.e., an oxide of a metal selected from the group consisting of zinc and copper, intimately dispersed in the matrix of said iron oxide, the degree of said dispersion being such as to characterize the catalyst prior to use by a magnetic susceptibility in the range from about 30 to about $300 \times 10^{-6}$ centimeter-gram-second unit (c.g.s.u.), and an alkali promoter, said catalyst composition having a surface area in the range from about 1 to about 5 square meters per gram (m.$^2$/g.). In the preferred embodiment of the invention, the metal oxide intimately dispersed in the matrix of the iron oxide is zinc oxide and the alkali promoter is a compound of an alkali metal, preferably potassium. Other compounds may be present in addition to the three essential ingredients such as stabilizers, diluents, binders, and the like.

The matrix promoter is zinc or copper oxide or a mixture thereof, but is can be produced from salts of those metals, in addition to oxides or hydroxides thereof. For instance, zinc acetate, zinc carbonate, zinc chloride, zinc nitrate, copper acetate, copper chloride, copper nitrate and copper carbonate can be used as the source of zinc and copper oxides. These salts readily form metal-ammine complexes with ammonia which aid in the formation of metal ferrites.

The matrix promoter is believed to function as a modifier or conditioner of the iron oxide component of the catalyst rather than to serve as a stabilizer to prevent the promoter from volatilizing or the catalyst from becoming inactive as is taught in the art. Accordingly, in the highly selective catalyst compositions of the present invention, a critical concentration of the second metal oxide, i.e., the matrix promoter, is intimately incorporated into the iron oxide matrix making the resulting composition distinguishable on the basis of its magnetic susceptibility. This magnetic susceptibility reflects the existence of the ferrites of zinc and/or copper, which are magnetic, in the catalyst composition.

By the procedure of my invention, a mixture of iron oxide and zinc and/or copper oxide is mulled with an aqueous ammonia solution containing an excess of ammonia over that required to convert the metals to metal ammine ions, such as $Zn(NH_3)_3{}^{+2}$, $Zn(NH_3)_4{}^{+2}$, $Cu(NH_3)_4{}^{+2}$ and $Zn(NH_3)_5{}^{+2}$. The metal-ammine complexes aid in the formation of zinc and copper ferrites which contribute to the magnetic susceptibility of the compositions. It is desirable that the amount of water during mulling be sufficient to form a paste or slurry which is readily mulled. Concentrated aqua ammonia (28% NH$_4$OH solution) is preferred but other concentrations are suitable. The wet mulling operation is continued until a dried specimen exhibits magnetic susceptibility in the range from about $30 \times 10^{-6}$ to about $300 \times 10^{-6}$ c.g.s.u. This is usually achieved in ¼ hour to 1 hour, depending on the size of the batch. Then the alkali promoter and other components are added and the resulting mixture is mulled to a paste, preferably of suitable consistency for extrusion to catalyst shapes. The mixture after being formed into catalyst shapes is air cured and calcined.

The catalyst produced by my invention contains iron oxide as the predominating active dehydrogenating constituent. A convenient and economical source of iron oxide is in the form of commercial pigments which are of uniform purity and particle size. However, iron oxides may also be prepared by the thermal decomposition of iron compounds such as ferric nitrate, ferric oxalate, and the like or by precipitation from solutions of iron salts such as ferric nitrate, ferrous sulfate, etc., followed by thermal decomposition. Generally, however, the latter procedures do not produce an oxide of uniform characteristics and high purity at a cost competitive with that of commercial pigments. The concentration of the iron oxide in the finished catalyst may vary over a wide range. The catalyst should contain on a finished basis at least about 35% by weight of iron oxide. Preferably, the concentration of iron oxide is maintained in the range from about 45% to about 95% by weight.

The concentration of the metal oxide employed as the matrix promoter added to the iron oxide is critical. Amounts employed are those in the range from about 1% to about 8% by weight of the total catalyst composition. Preferably, the matrix promoter should be present in the amounts from about 2% to about 5% by weight of the total catalyst composition.

An alkali promoter is also an essential constituent of the catalyst. Compounds of the alkali metals such as the oxides or compounds convertible at least in part under dehydrogenation conditions to the oxides such as the hydroxides, the carbonates, the bicarbonates, the phosphates, the borates, the acetates, the chromates and dichromates, and the like are useful as promoters. Of the alkali metal compounds, potassium compounds are preferred. Cesium and rubidium compounds are suitable but are generally not used because of their high cost. While the sodium compounds are less expensive than those of potassium, the latter are considered to be superior as promoters. A particularly preferred promoter is potassium carbonate. The amount of promoter in the catalyst may vary from about 0.5% by weight of the catalyst up to about 50% by weight or more. Preferably, the alkali metal promoter is incorporated in the catalyst in amounts from about 5% to about 35% by weight. If it is desired to control the dehydrogenation of ethylbenzene so that the least possible amount of toluene will be produced while the maximum yield of styrene is being attained, a composite promoter can be used. Such a promoter is one containing a potassium compound and a compound of a metal chosen from the group consisting of sodium, lithium, barium, magnesium, and calcium wherein the potassium compound constitutes at least 1% by weight of the total catalyst composition and the weight ratio of the second metal compound to the potassium compound is maintained within the range from about 1:1 to about 5:1 and preferably from about 1:1 to about 2:1 as described in the Emerson H. Lee Patent 3,100,234.

As indicated above, other ingredients may be present, as desired, in the catalyst composition. Heavy metal oxides more difficultly reducible than iron oxide which function as stabilizers can be included, for example. The concentration of such stabilizers is not critical. Only small amounts are required. Chromium oxide is the preferred stabilizer and this compound is generally employed in amounts from about 1% to about 5% by weight. Diluent materials such as alumina, zirconia, beryllia, and asbestos can also be incorporated in the catalyst as can binding agents, for example, silicates, hydraulic cements such as Portland cement, calcium aluminate cement, kaolin, ball clay and the like, if desired, which impart structural stability to the catalyst composition.

The shape and size of the catalyst particles are not critical. For example, the catalyst may be in the form of pellets, powders, pills, tablets, spheres, saddles, etc. Symmetrical pills of ⅟₅₀ inch to ¾ inch in diameter and ⅟₁₆ inch to 1 inch in length are considered to be satisfactory. The preferred size of the catalyst particles for most commercial operations is usually from ⅟₁₆ to ³⁄₁₆ inch in diameter.

Surface area of the catalyst, however, is a critical factor. Even if the matrix promoter is present as determined by magnetic susceptibility measurements in the range specified, the desired selectivity of reaction is not obtained if the surface area of available surface of the catalyst is too large. Thus, the improved catalysts of the invention are those with a surface area or available surface from about 1 to about 5 square meters per gram. It is preferred to adjust the surface area during the manufacture of the catalyst; however, with some formulations, catalysts can be prepared with higher surface areas allowing for subsequent surface area reduction to the preferred range during use of the catalyst.

My invention is disclosed in further detail by means of the following example. It will be understood by those skilled in the art that various modifications of these procedures can be made without departing from the invention. For instance, the quantities of materials can be varied within the ranges set forth herein, the times of various operations can be varied with respect to the size of the batches and the type of equipment used, and temperatures and concentrations can be adjusted for optimum efficiency within the ranges set forth.

EXAMPLE 1

A pair of catalysts was prepared by the wet mulling procedure with definite amounts of iron oxide and zinc oxide or definite amounts of iron oxide and copper oxide. The catalysts as prepared both contained about 26% potassium carbonate ($K_2CO_3$) as a promoter, 2.5% chromic oxide ($Cr_2O_3$) as a stabilizer, about 20% portland cement as a binder, and a fixed amount of iron oxide as the active catalytic agent with either zinc oxide or copper oxide as a matrix promoter.

An iron oxide-zinc oxide catalyst composition was produced by the following procedure:

There was placed in a Simpson Mix Muller 2772 parts by weight of pigment grade iron oxide ($Fe_2O_3$) and 300 parts by weight of zinc oxide (ZnO). The components were mixed dry for five minutes. Next there was added 1500 parts by weight of a 28% $NH_4OH$ solution as the mulling was continued for five minutes while the solution was added. The thus wetted mix was then mulled for 15 minutes, and at the end of this time 1578 parts by weight of postassium carbonate ($K_2CO_3$) was added, followed by 150 parts by weight of chromium oxide ($Cr_2O_3$). After the promoter and stabilizer had thus been added, there was mixed in 1200 parts by weight of portland cement and 100 parts by weight of water. After ten minutes additional mixing, the mass was extruded as ⅛ inch diameter extrusions.

The extrusions were cured in air for six days and then calcined for two hours at 250° F., two hours at 400° F. and six hours at 1300° F.

The analysis of this catalyst (No. 1) was as follows:

| | Percent |
|---|---|
| $Fe_2O_3$ | 46.2 |
| ZnO | 5.0 |
| $K_2CO_3$ (18% as $K_2O$) | 26.3 |
| $Cr_2O_3$ | 2.5 |
| Portland cement | 20.0 |

A second catalyst (No. 2) was produced by the same procedure but with 300 parts by weight of copper oxide (CuO) in lieu of the zinc oxide.

The specific surface area or available surface of both of these catalysts was determined and the magnetic susceptibility of each of them was measured.

Experiments were conducted to determine the effectiveness of these catalysts for the production of styrene. Simultaneously, a commercially available alkali-promoted iron oxide catalyst was tested. All catalysts were employed in the form of ⅛ inch extrusions. The dehydrogenation of ethylbenzene using these catalysts was effected in an isothermally operated integral reactor consisting of a 5 ft. stainless steel tube 1¼ in. inside diameter heated by electrical means and encased in an insulated jacket. The reactor was packed with catalyst by pouring the material into the tube through a funnel to obtain a loosely packed bed about 43 in. deep supported on a stainless steel screen. Sample taps and thermocouples reaching into the catalyst bed were provided at 6-in. intervals along the length of the bed. The temperature of the catalyst bed was brought up to about 300° C. with nitrogen flowing through the reactor. Steam was then introduced and the temperature was raised to 600° C. and allowed to remain at this level overnight for preconditioning of the catalyst. Steam and ethylbenzene (99.7%) in a weight ratio of about 2.2:1 was then fed to the reactor at a gas hourly space velocity of 595 (volume of feed gases at standard temperature and pressure per volume of catalyst per hour) while it was maintained at a temperature of about 600° C. Conversions over a wide range were measured by means of samples drawn from the taps in the reactor; flows from the sample taps never exceeded about 10% of the total flow to avoid changing the flow pattern in the reactor. The effluent gas streams passed from the reactor into a water-cooled condenser and the condensates were collected in receiving flasks. Non-condensible gas was passed through a wet test meter and vented after measuring. Samples of the organic condensates were analyzed for styrene, benzene, and toluene with precautions being taken to prevent any loss of benzene and toluene from the sample. Selectivity for styrene for each catalyst tested is recorded in Table I below together with the composition, the specific surface area, and the magnetic susceptibility of the catalysts. Selectivity is defined as follows:

$$\text{Selectivity} = \frac{\text{Moles Styrene}}{\text{Moles (Styrene + Benzene + Toluene)}} \times 100$$

All selectivity data are for the catalytic reaction only, corrections based on experimental determination having been made for any thermal reaction occurring.

the life of such a catalyst is significantly increased over that of conventional iron oxide catalysts.

While the invention has been illustrated specifically by the dehydrogenation of ethylbenzene to styrene, the catalysts of the invention are equally useful in the dehydrogenation of various other alkyl aromatic hydrocarbons having an alkyl side chain of at least two carbon atoms such as, for example, propylbenzene, diethylbenzene, ethyltoluene, propyltoluene, ethylnaphthalene, diethylnaphthalene, diethyldiphenyl and the like to the corresponding alkenyl aromatic hydrocarbons. Likewise, the catalysts of the invention are suitable for use in the production of diolefins by dehydrogenation of monoolefins having at least four non-quaternary carbon atoms in a straight chain. They are particularly useful, for example, in the production of butadiene from butylene and are also applicable and advantageous for the production of other diolefins and particularly conjugated diolefins such as piperylene, isoprene, the various hexadienes and the like from the corresponding monoolefins.

I claim:

1. In a method of producing a dehydrogenation catalyst containing at least 35% by weight of iron oxide as the active catalytic agent, from about 1% to about 8% by weight of a matrix promoter of zinc or copper oxides and from about 0.5 to about 50% by weight of an alkali promoter, the step which comprises mulling said iron oxide and said matrix promoter with aqueous ammonia until the resulting composition has a magnetic susceptibility in the range from about $30 \times 10^{-6}$ to about $300 \times 10^{-6}$ c.g.s.u.

2. Method of claim 1 wherein the amount of matrix promoter is from about 2% to about 5% of the catalyst weight.

3. Method of claim 2 wherein an alkali promoter equivalent to about 5% to about 35% of the dry catalyst weight is subsequently incorporated in the catalyst composition.

4. Method of claim 3 wherein the alkali promoter is potassium carbonate.

5. Method of claim 4 wherein chromic oxide equivalent to about 1% to about 5% of the dry catalyst weight is subsequently incorporated in the catalyst composition.

6. Method of claim 5 wherein the matrix promoter is zinc oxide.

TABLE

| Catalyst No. | $Fe_2O_3$ (wt. percent) | Matrix promoter | Amt. of matrix promoter (wt. percent) | Surface area (m.²/g.) | Magnetic susceptibility (vol.) (cgsu×10⁻⁶) | Net conv. across catalyst bed (%)¹ | Selectivity to styrene mole percent | Hours |
|---|---|---|---|---|---|---|---|---|
| 1 | 46.2 | ZnO | 5.0 | 2.3 | 195.8 | 45.9<br>54.7<br>60.5 | 94.6<br>93.6<br>91.8 | 1,097 |
| 2 | 46.2 | CuO | 5.0 | 3.2 | 202.5 | 45.7<br>53.6<br>61.1 | 94.6<br>93.6<br>92.8 | 944 |
| Commercial catalyst | | None | | 4.5 | 16.8 | 45.9<br>51.3<br>56.1 | 93.8<br>92.9<br>91.8 | 1,095 |

¹ Wt. percent styrene in dehydrogenated mixture.

The selectivity data presented in Table I demonstrate clearly the superiority of the catalysts produced by this invention over the iron oxide catalysts in the art. When the catalyst has a magnetic susceptibility from about 30 to about $300 \times 10^{-6}$ c.g.s.u. it is much more selective for styrene production than are catalysts with lower magnetic susceptibility. As a consequence styrene production over References Cited

UNITED STATES PATENTS 3,209,049  9/1965  Pitzer _____ 260—680
3,084,125  4/1963  Sonderquist _____ 252—430

PATRICK P. GARVIN, *Primary Examiner.*

U.S. Cl. X.R.

252—468, 470, 473, 474